Oct. 27, 1959 R. L. BEYERSTEDT 2,910,132
TRACTOR BATTERY ARRANGEMENTS
Filed July 20, 1956
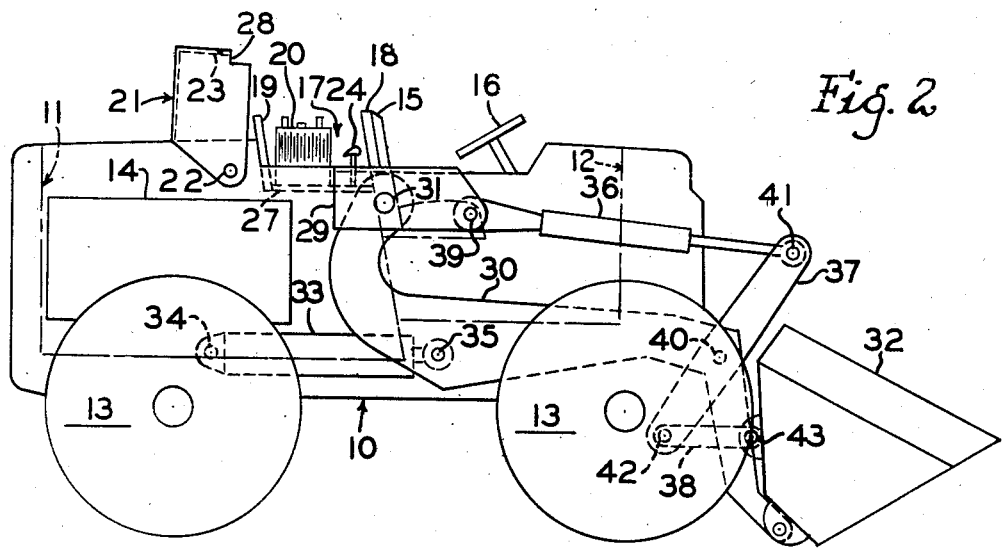
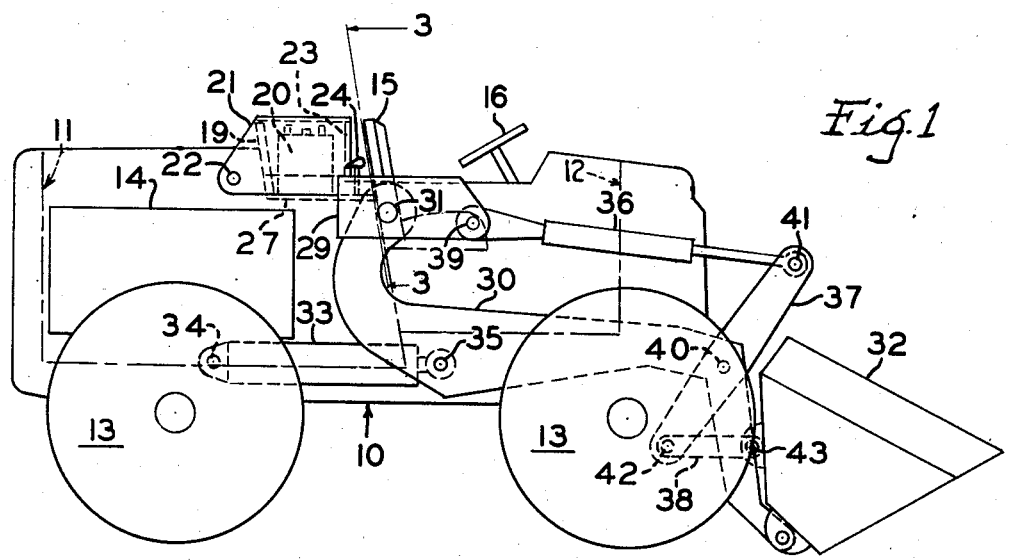
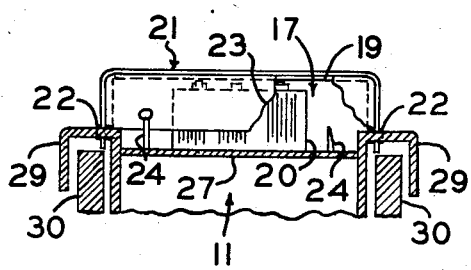
INVENTOR.
Ralph L. Beyerstedt
BY Paul O. Pippel
atty.

United States Patent Office 2,910,132
Patented Oct. 27, 1959

2,910,132

TRACTOR BATTERY ARRANGEMENTS

Ralph L. Beyerstedt, Libertyville, Ill., assignor to The Frank G. Hough Co., a corporation of Illinois Application July 20, 1956, Serial No. 599,042

2 Claims. (Cl. 180—68.5)

This invention relates generally to tractor loaders, and more specifically to an improved battery mounting arrangement for a front end type power loader.

Front end type tractor loaders or power loaders as generally known in the art comprise a tractor or prime mover which may be of the four wheel rubber tired type or of the crawler track type. A bucket or material handling implement is operatively carried from the tractor and extends from the forward end of the tractor. These tractor loaders are manufactured in many different sizes, and these various sizes cause a number of problems to arise in the manufacture of these loaders, especially when any attempt is made to standarize the arrangement or location of any component.

A common problem that arises with loaders of many sizes is the arrangement and disposition of the battery for the tractor. Placing the battery within one portion of the tractor which may be convenient to a person on the ground for one sized tractor may be a very inconvenient and inaccessible location for a tractor of another size. The problem of inaccessibility of the battery in these loaders is heightened when one considers the constant attention which the average battery used in a power loader requires.

It is the object of the present invention to provide a battery arrangement for a certain type of power loader wherein easy accessibility is provided for maintenance of the battery no matter what particular size the loader may be.

It is another object of the present invention to provide a battery arrangement for a front end type power loader wherein the operator's compartment is disposed forwardly of the engine compartment and wherein easy accessibility is provided to the battery from the operator's compartment and from the engine compartment.

It is another object of the present invention to provide a covered battery compartment for any sized power loader of the front end type wherein the operator's compartment is positioned forwardly of the engine compartment and wherein the battery may be maintained from the seat in the operator's compartment.

Other objects and the features of the present invention will be apparent upon a perusal of the following specification and drawing, of which:

Figure 1 is a side elevational view of a power loader constructed according to the present invention;

Figure 2 is a view as shown in Figure 1 with the battery cover shown in the open position; and Figure 3 is a cross sectional view of the structure shown in Figure 1 and taken along the line 3—3 of Figure 1.

The present embodiment is the preferred embodiment but it is to be understood that changes can be made in the present embodiment by one skilled in the art without departing from the spirit and scope of the present invention.

For a detailed description of the present invention reference is made to the drawing. A tractor 10 of the four wheel rubber tired type is provided. The tractor 10 comprises a rearwardly disposed engine compartment 11, and a forwardly disposed operator's compartment 12 supported by wheels 13. The tractor may be of any size suitable for the load to be imposed thereupon by the tool means of the loader. The arrangement of the tractor with the operator's compartment 12 disposed in the forward portion thereof and with the engine compartment 11 disposed in the rearward portion thereof provides many advantages for the operation of the loader, such as the excellent visibility by the operator of the tool means and the material being worked, and the excellent distribution of the weight of the tractor and its tool means. The rearwardly disposed engine compartment 11 includes an engine (not shown) therein for operation of the loader, and access to the engine is gained through panels 14 disposed on each side of the tractor 10. The operator's compartment 12 is of a size convenient for the average operator and includes a seat 15 and various controls for operation of the loader, such as the steering wheel 16 for steering the tractor 10. The operator's compartment 12 is substantially the only component of the loader which is made of a standard size conforming to the average size of an operator. Further, it is desirable that the operator's compartment remain as uncluttered as possible to permit maximum efficiency in the normal operation of the loader.

The space immediately behind the operator's compartment 12 and at the upper forward end of the engine compartment 11 is occupied by the battery compartment 17. The battery compartment 17 is formed by the rear wall 18 of the operator's compartment 12, a plate 19 which is rearwardly spaced from the wall 18, a bottom wall 27, and the sides of the tractor 10. The rear wall 18 of the operator's compartment 12 may also be defined as the rear side of the seat 15, since the rear wall 18 and the seat 15 both extend some distance above the upper marginal edge of the tractor 10. This higher position of the seat 15 relative to the tractor 10 provides clearance for the arms and shoulders of an operator seated in seat 15. The battery 20 is mounted within the battery compartment 17 substantially at the top edge of the operator's compartment 12. To protect the battery 20 and the battery compartment 17, a cover 21 is provided. The cover 21 is substantially U-shaped with the cross piece thereof slightly wider than the width of the battery compartment 17. One corner of each leg of the U-shaped cover 21 is pivotally mounted to the tractor 10 rearwardly of the battery compartment 17 by pivotal mounting means 22. This mounting arrangement of the cover 21 permits the cover to be pivoted forwardly and downwardly to a position such as shown in Figure 1 to cover the battery compartment 17 and to be pivoted rearwardly to a position such as shown in Figure 2 to uncover the battery compartment 17 and to provide easy access to the battery 20 within the battery compartment 17 by an operator positioned within the operator's compartment 12. The plate 19 has a width substantially equal to the distance between the legs of the cover 21, and a height sufficient to cooperate with the underside of the cross piece of the cover 21 in the closed position of the cover 21 so that in the closed position of the cover 21, the rearward side of the battery compartment 17 is effectively sealed. A plate 23 is secured between the forward marginal edges of the cover 21 and in the closed position of the cover 21, latches 24 are provided for securing the cover 21 against any accidental movement. The latches 24, which may be of any suitable type, are shown as spring clips with the lower ends thereof secured to the bottom wall 27 and with the upper ends formed to be readily engageable with small notches in plate 23. The lower forward edge of each leg of the cover 21 is provided with a notch 28 which cooperates with an L-shaped plate 29 extending from each side of the tractor 10 at the upper edge thereof so that in the closed position of the cover 21, its forward edges rest upon the plates 29. It should be noted that with the above described arrangement, the battery 20 is easily accessible to an operator within the operator's compartment 12 for any maintenance of the battery 20, the cover 21 efficiently protects the battery compartment 17 and, further, through its pivotal arrangement provides easy access to the battery compartment 17. Additionally, the battery compartment 17 is centrally located of the tractor 10 and conveniently positioned to the engine compartment 11. Each of these noted advantages are provided for no matter what the size of the tractor.

The tool arrangement of the present invention comprises a boom 30 formed in duplicate portions disposed on each side of the tractor 10. One end of the boom 30 is pivotally mounted between the tractor 10 and the plates 29 by means of mounting means 31. A bucket 32 is pivotally carried on the forward end of the boom 30. A hydraulic ram 33 formed in duplicate portions disposed on each side of the tractor 10 is provided for raising and lowering the boom 30. The head end of the hydraulic ram 33 is pivotally mounted to the tractor 10 by means of mounting means 34. The rod end of the hydraulic ram 33 is pivotally mounted to the boom 30 by means of mounting means 35. To control the tilt of the bucket 32 relative to the boom 30, a linkage arrangement is provided. The linkage arrangement which is formed in duplicate portions disposed on each side of the tractor 10 comprises a hydraulic ram 36, a lever 37 and a link 38. The head end of the hydraulic ram 36 is pivotally mounted between the tractor 10 and the plates 29 by means of mounting means 39. The lever 37 is pivotally mounted intermediate the ends thereof to the boom 30 intermediate the ends thereof by means of mounting means 40. One end of the lever 37 is pivotally mounted to the rod end of the hydraulic ram 36 by mounting means 41. The other end of the lever 37 and one end of the link 38 are pivotally interconnected by mounting means 42. The other end of the link 38 is pivotally mounted to the bucket 32 by mounting means 43. As the hydraulic ram 33 is extended and contracted, the boom 30 is raised and lowered. As the hydraulic ram 36 is extended and contracted, the lever 37 is pivoted to move the link 38 to tilt the bucket relative to the boom 30 to any desired position. The operator of the loader is seated on seat 15 within the operator's compartment 12 for operation of the loader. The operator of the loader looks forwardly thereof to watch the bucket 32 as it is controlled throughout its various functions. Meanwhile, as described above, the battery 20 is efficiently mounted behind the operator of the loader for ready accessibility for any maintenance of the battery 20.

Having described the invention, what is considered new and desired to be protected by Letters Patent is:

1. In a tractor loader having tool means operatively carried by said tractor and extending forwardly of said tractor, said tractor having a rearwardly disposed engine compartment and a forwardly disposed operator's compartment with an operator's seat mounted in said operator's compartment to face forwardly of said tractor and having said operator's seat disposed to extend some distance above the upper edge of said tractor, a battery compartment formed in said tractor at the upper forward end of said engine compartment and immediately rearwardly of said operator's compartment and said operator's seat and substantially rearwardly adjacent to the upper marginal edge of said operator's seat, a U-shaped cover for said battery compartment, pin means pivotally mounting the ends of the legs of said U-shaped cover on each side of said tractor rearwardly of said battery compartment so that said cover is manually pivotable from said operator's seat forwardly to cover said battery compartment and rearwardly to uncover said battery compartment, a plate secured across the forward marginal edges of said cover, said cover having a length sufficient to permit said plate to project between a battery in said battery compartment and the rearward side of said operator's seat when said cover is forwardly pivoted to cover said battery compartment, a second plate secured to said tractor transversely thereof on the rear side of said battery compartment, said second plate having a height sufficient to cooperate with the rear marginal edges of said cover to close the upper rear portion of said battery compartment when said cover is forwardly pivoted to cover said battery compartment.

2. In an arrangement as claimed in claim 1, wherein clamping means are provided for locking said cover in the closed position, said clamping means secured at the forward end of said battery compartment and operatively engageable with said first plate.

References Cited in the file of this patent

UNITED STATES PATENTS

| | | |
|---|---|---|
| 980,603 | Clarke | Jan. 3, 1911 |
| 1,067,256 | Kennedy | July 15, 1913 |
| 1,164,755 | Rouse | Dec. 21, 1915 |
| 1,165,784 | Klengelsmith | Dec. 28, 1915 |
| 2,095,344 | Nelson | Oct. 12, 1937 |
| 2,645,369 | Allan | July 14, 1953 |